US009172698B1

(12) United States Patent
Evans et al.

(10) Patent No.: US 9,172,698 B1
(45) Date of Patent: Oct. 27, 2015

(54) SYSTEM AND METHOD FOR KEY GENERATION IN SECURITY TOKENS

(71) Applicant: UT-Battelle, LLC, Oak Ridge, TN (US)

(72) Inventors: Philip G. Evans, Knoxville, TN (US); Travis S. Humble, Knoxville, TN (US); Nathanael R. Paul, Knoxville, TN (US); Raphael C. Pooser, Knoxville, TN (US); Stacy J. Prowell, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 142 days.

(21) Appl. No.: 14/052,065

(22) Filed: Oct. 11, 2013

Related U.S. Application Data

(60) Provisional application No. 61/712,855, filed on Oct. 12, 2012.

(51) Int. Cl.
*G06F 21/34* (2013.01)
*H04L 29/06* (2006.01)
*H04W 12/06* (2009.01)

(52) U.S. Cl.
CPC ............ *H04L 63/0853* (2013.01); *G06F 21/34* (2013.01); *H04W 12/06* (2013.01)

(58) Field of Classification Search
CPC ..... H04W 12/06; G06F 21/34; H04L 63/0853
See application file for complete search history.

(56) References Cited

U.S. PATENT DOCUMENTS

| | | | |
|---|---|---|---|
| 6,275,919 B1 * | 8/2001 | Johnson | 711/216 |
| 6,865,673 B1 | 3/2005 | Nessett et al. | |
| 7,610,491 B1 | 10/2009 | Tsao | |
| 8,059,814 B1 | 11/2011 | Duane | |
| 8,312,519 B1 * | 11/2012 | Bailey | H04L 9/003 380/255 |
| 8,538,014 B2 * | 9/2013 | Perlman | 380/28 |
| 8,683,564 B2 * | 3/2014 | Khan | H04L 9/3228 713/168 |
| 8,769,637 B2 * | 7/2014 | Janzen | 726/5 |
| 2003/0009666 A1 * | 1/2003 | Jakobsson | H04L 9/3236 713/168 |
| 2003/0059045 A1 * | 3/2003 | Ruehle | G06F 7/582 380/46 |
| 2003/0118185 A1 | 6/2003 | Lambert | |
| 2003/0149869 A1 | 8/2003 | Gleichauf | |
| 2004/0019788 A1 * | 1/2004 | Miyazaki | H04L 9/3236 713/169 |
| 2005/0036624 A1 | 2/2005 | Kent et al. | |
| 2005/0050328 A1 | 3/2005 | Mizrah | |
| 2005/0256910 A1 * | 11/2005 | Kim | G06F 21/10 |
| 2007/0050635 A1 * | 3/2007 | Popp | H04L 9/0863 713/185 |
| 2007/0174614 A1 * | 7/2007 | Duane | G06F 21/31 713/168 |

(Continued)

OTHER PUBLICATIONS

Bank of China, "Security Mechanism (Corporate Service)", Jan. 2, 2009, pp. 1-3.*

(Continued)

*Primary Examiner* — Kaveh Abrishamkar
*Assistant Examiner* — James J Wilcox
(74) *Attorney, Agent, or Firm* — Warner Norcross & Judd LLP

(57) ABSTRACT

Functional randomness in security tokens (FRIST) may achieve improved security in two-factor authentication hardware tokens by improving on the algorithms used to securely generate random data. A system and method in one embodiment according to the present invention may allow for security of a token based on storage cost and computational security. This approach may enable communication where security is no longer based solely on onetime pads (OTPs) generated from a single cryptographic function (e.g., SHA-256).

5 Claims, 4 Drawing Sheets

(56) References Cited

U.S. PATENT DOCUMENTS

| | | | |
|---|---|---|---|
| 2008/0063190 A1* | 3/2008 | Campagna et al. | 380/44 |
| 2008/0310624 A1 | 12/2008 | Celikkan et al. | |
| 2009/0224884 A1 | 9/2009 | Tuttle | |
| 2010/0115278 A1 | 5/2010 | Shen et al. | |
| 2010/0211787 A1 | 8/2010 | Bukshpun et al. | |
| 2010/0241872 A1 | 9/2010 | Pinder | |
| 2011/0026715 A1* | 2/2011 | Rossi | H04L 9/083 380/278 |
| 2011/0202755 A1 | 8/2011 | Orsini et al. | |
| 2011/0238639 A1 | 9/2011 | Matsuura | |
| 2011/0296440 A1 | 12/2011 | Laurich et al. | |
| 2012/0084806 A1 | 4/2012 | Fahrny et al. | |
| 2013/0129080 A1 | 5/2013 | Tang et al. | |
| 2013/0227286 A1 | 8/2013 | Brisson | |
| 2013/0283034 A1* | 10/2013 | Marlow | H04L 9/3228 713/150 |
| 2013/0315395 A1 | 11/2013 | Jacobs | |
| 2014/0219443 A1 | 8/2014 | Brainis et al. | |
| 2014/0237251 A1* | 8/2014 | Kaluzhny | H04L 63/123 713/176 |
| 2014/0281506 A1* | 9/2014 | Redberg | H04L 63/067 713/159 |
| 2014/0302820 A1 | 10/2014 | Jones | |

OTHER PUBLICATIONS

Page, "Application of Hash Chains and Hash Structures to Cryptography," Aug. 4, 2009, pp. 1-234.*

Roe, "Performance of Protocols, Centre for Communications Systems Research, Security Protocols," LNCS 1796, 2000, pp. 140-146.*

Stefanov, Andre, et al, "Optical quantum random number generator," J. Mod. Opt., vol. 47, No. 4, pp. 595-598 (2000).

Jennewein, Thomas, et al, "A fast and compact quantum random number generator," Rev. Sci. Instrum., vol. 71, No. 4, pp. 1675-1680 (2000).

Rarity, J.G., et al, "Quantum random-number generation and key sharing," J. Mod. Opt., vol. 41, No. 12, pp. 2435-2444 (1994).

Stipcevic, M., et al, "Quantum random number generator based on photonic emission in semiconductors," Rev. Sci. Instrum. 78, 045104, pp. 1-7 (2007).

Wayne, Michael A., et al, "Low-bias high-speed quantum random number generator via shaped optical pulses," Optics Express, vol. 18, No. 9, pp. 9351-9357 (2010).

Satoh, Akashi, "Hardware Architecture and Cost Estimates for Breaking SHA-1," Information Security: 8th International Conference, ISC 2005, LNCS 3650, pp. 259-273 (2005).

Adrian Perrig, Robert Szewczyk, J.D. Tygar, Victor Wen, and David E. Culler, "SPINS: Security Protocols for Sensor Networks," Wireless Networks Journal, 2002.

Erik Riedel and Garth A. Gibson, "Active Disks—Remote Execution for Network-Attached Storage," Carnegie Mellon University Technical Report CMU-CS-97-198, Dec. 1997.

* cited by examiner

SYSTEM AND METHOD FOR KEY GENERATION IN SECURITY TOKENS

CROSS-REFERENCE TO RELATED APPLICATIONS

This application claims the benefit of U.S. Provisional Application No. 61/712,855, filed Oct. 12, 2012, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to security authentication, and more specifically to an apparatus and method for two-step authentication.

Authentication between computers occurs on a daily basis. Authentication in many cases helps entities confirm their identity to gain access to information. For example, an entity, such as a user of a computer or software running on the computer, may communicate with another computer to confirm the identity of one or more of the communicating entities, including the user, the software, the computer, or the other computer, or a combination thereof. In this way, entities can operate with a degree of certainty that communications are from whom the communication claims to be. One type of authentication system prevalent in and outside the Internet utilizes password-only authentication with a username/password combination. Authentication transactions such as these are nearly ubiquitous in network communications.

However, there are also those who try to attack or impersonate other entities to gain access that would otherwise be denied. These type of attacks also occur on a daily basis, and often times include attempts on popular websites (e.g., gmail.com, yahoo.com) to gain privileged access by guessing username/password combinations. Attackers are in some cases successful, because many passwords are easy to guess. As a result, password-only authentication systems, or systems solely based on something you know, have been considered less secure than two-factor authentication systems—systems based on two of the following: (1) something you know, (2) something you have, and (3) something you are (e.g., a biometric fingerprint).

Many two-factor authentication systems utilize a password and a security token in possession of the entity. As an example, a user may authenticate themselves by entering their password and a onetime pad (OTP) conventionally generated by the security token. The OTP conventionally generated from the security token (something you have) is combined with the password (something you know) to form a two factor authentication system. Many of these hardware authentication tokens or security tokens are now about the size of a keychain, and offer a degree of assurance that the entity providing the password and OTP is whom they claim to be. However, these two-factor authentication systems are also not without weaknesses. The security of the two-factor system is based primarily on two premises: 1) it is hard for an adversary to gain access to an entity's password and 2) the OTP conventionally generated from the security token is random and cannot be reproduced computationally. This second premise has been reported as being subject to compromise in conventional two-factor systems. For instance, RSA, a well-known two-factor hardware security token vendor, has been reportedly compromised in recent times. Many believe the compromise is related to the underlying conventional algorithm used to generate the OTP.

The OTP in this and other conventional two-factor systems is based on a pseudorandom stream of randomness, or a computationally random seed. By using hash computation tables, the hashing algorithm or function used to generate the OTP may be reverse engineered and reduced to the original seed value, and subsequent random numbers or OTPs resulting from the hash function may be computed. In other words, an attacker may generate random numbers or OTPs that mimic those of the security token without actually possessing the security token. Thus, the reliance on a pseudorandom stream of randomness based on a function that is seeded by an unknown pseudorandom value may be misplaced.

SUMMARY OF THE INVENTION

Systems and methods for generating a onetime pad (OTP) are provided. The systems and methods may utilize a hash change modification, such as adjusting a hashing function or an initial seed, or both, to potentially achieve functional randomness in a security token for authentication.

In one aspect, a method includes generating an OTP in a security token for authentication of an entity, which may be physically associated with the security token. The OTP may be used in a multiple factor authentication request to authenticate the entity as whom it claims to be. For example, the multiple factor authentication request may be based on a two-factor authentication system in which one factor is the OTP, and the other factor is a user password. An authentication server may receive the authentication request, and compare it against a known user password and a server-side OTP to confirm the identity of the entity.

In one embodiment, the method includes applying a hash function to an input to generate an output. The output of the hash function may be based on an initial seed, and may be promoted as the OTP for use in the authentication request. The process of generating an output to be promoted as an OTP may be iterative such that the input to the hash function for subsequent iterations may be the current OTP and the output of the hash function based on the current OTP may be promoted as the subsequent OTP. In order to achieve enhanced security, the method may adjust at least one of the hash function and the initial seed to affect subsequent outputs or OTPs. In this way, the hash chain associated with a particular hash function and initial seed may be changed, thereby potentially preventing an attacker who has compromised one hash chain from using that knowledge to continue to obtain access or fake authentication.

In one embodiment, the method may adjust at least one of the hash function and the initial seed in response to one or more events. This adjustment may be referred to as a hash modification, and may, for example, occur after a predetermined period of time or in response to another time-based event. As another example, the hash modification may occur in response to the number of times a hash chain has been used, or the number of OTPs used in a hash chain, exceeding a threshold number. In yet another example, the hash modification may occur in response to a remote command.

In one aspect, a security token for generating a onetime pad (OTP) includes a processer and a memory operable to store a sequence of randomness and computer programmed instructions executable by the process. The security token may be physically associated with an entity such that the OTPs generated from the security token may be used in conjunction with one or more factors to form an authentication request to authenticate the entity.

In one embodiment, the security token stores instructions to perform the steps of segmenting the sequence of randomness into a plurality of seeds, and selecting an initial seed from among the plurality of seeds. The program steps may also include applying a hash function to an input to generate an output, where the output is based on the initial seed, promoting the output of the hash function as the OTP for use in the authentication request, and, in response to a hash modification event, adjusting at least one of the hash function and the initial seed to affect a subsequent output of the hash function. In this way, the OTPs or the seeds used as basis for generating the OTPs may be stored in the security token, but the generation of the OTPs may not be completely dependent on a single function.

The systems and methods described herein attempt to break away from or avoid dependence solely on computational security for communication. In other words, the reliance on a pseudorandom stream of randomness based on a function that is seeded by an unknown value may be less secure than system and methods described herein. And, by using the systems and methods described herein, entities may avoid part of the security threats believed to be in conventional hardware security authentication tokens.

These and other objects, advantages, and features of the invention will be more fully understood and appreciated by reference to the description of the one or more embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

A system and method for authentication in accordance with one or more embodiments of the present invention is shown in FIGS. 1-4. As set forth below, the system and method utilize two-factor authentication for authenticating an entity as being whom they claim to be. It should be understood, however, that the features described herein are not limited to two-factor authentication systems, and may be utilized in other authentication methodologies, such as single or multiple factor authentication systems, or in encrypting communication between two or more entities, or a combination thereof.

Figure 1:
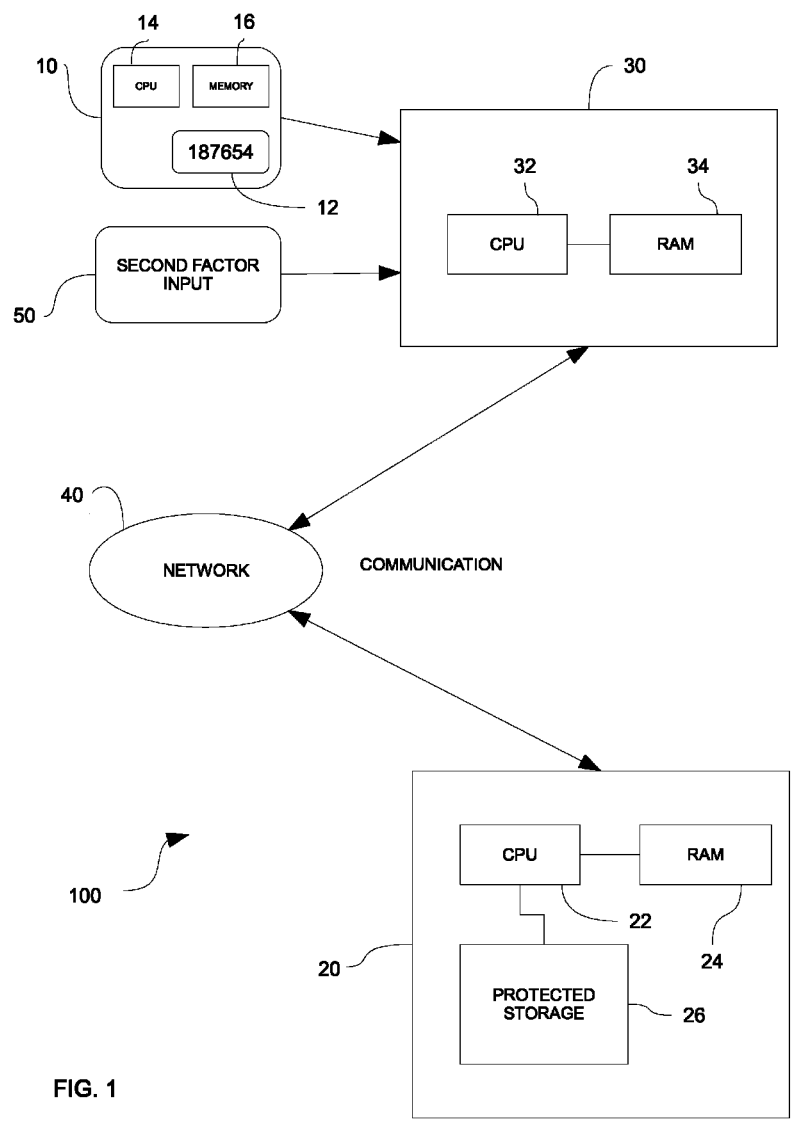
FIG. 1 is a system according to an embodiment of the present invention.
Figure 2:
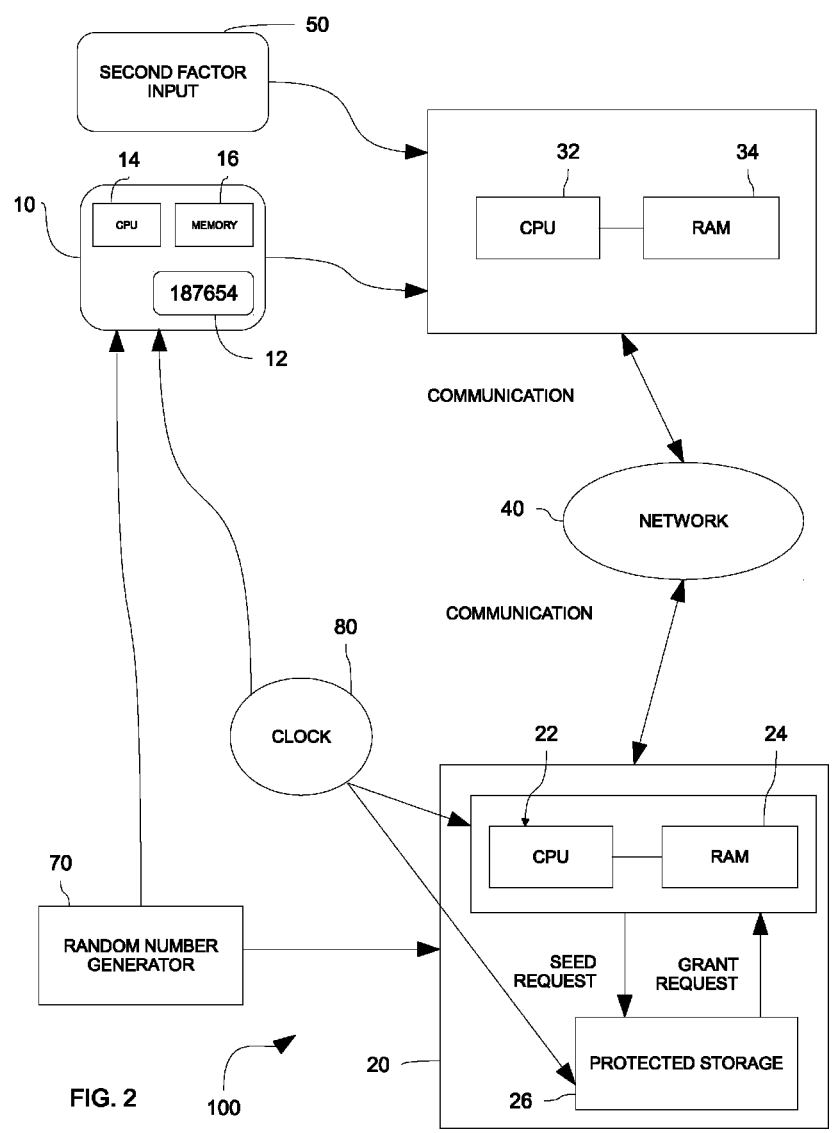
FIG. 2 is a system according to an embodiment of the present invention.

Referring now to the illustrated embodiment of FIGS. 1 and 2, a system according to one embodiment of the present invention is generally designated 100, and includes a device 10 and an authentication server 20. The authentication server 20 may include an internal processor 22, internal memory 24, and protected storage 26. The device 10 in the illustrated embodiment is a security token having an internal processor 14, internal memory, and protected storage 16, which may be similar to internal processor 22, internal memory 24, and protected storage 26 of the authentication server 20. The device 10 may generate an OTP or key for authenticating with the authentication server 20, and may be portable such that it can be carried by a person, or may be integrated into another device, such as a smart meter, appliance or other device, for authentication. The OTP, or the seed for generating the OTP, or both, used in authentication may be stored in the protected storage 26 of the authentication server 20. Likewise, the OTP, or the seed for generating the OTP, or both, used in authentication may be stored in the protected storage 16 of the device 10. As will be described herein, one of more of the OTP and the seed may be based on a random stream of bits provided by a random number generator 70. It should be understood that the random number generator 70 may be any type of random number generator, including, for example, a true random number generator, a source of true randomness, or a high quality random number generator, or a combination thereof. In one embodiment, the random stream may be provided to both the device 10 and the authentication server 20 along with a synchronization signal based on a clock 80. As an example, the random stream may be provided at manufacture to the device 10, as well as to the authentication server 20. The device 10 may also be synchronized, loosely or precisely, with the authentication server 20 such that an OTP or key generated by the device 10 at any given time corresponds to an OTP or key requested or obtained from the protected memory 26 of the authentication server 20.

In the illustrated embodiment, the device 10 includes a display 12 capable of presenting the OTP for use in authentication. It should be understood that the device 10 may communicate the OTP through channels other than the display 12, such as a network, and that the device 10, in some embodiments, may not include the display 12. The authentication server 20, similar to the device 10, may be a standalone server or device or may be integrated into other components or devices.

As shown in the illustrated embodiment of FIG. 1, the system 100 includes a client device 30 through which an entity, such as a user, may authenticate with the authentication server 20. The client device 30 may include an internal processor 32 and internal memory 34, and the ability to communicate with the authentication server 20 through a network 40. The client device 30 may be configured to authenticate a user with the authentication server 20 at least in part based on an OTP generated by the device 10, enabling the user or entity to obtain access to privileged information. In one embodiment, the client device 30 may be configured to authenticate a user according to a two-factor method, described in further detail below, that also includes obtaining a second input 50, such as a password or personal identification number (PIN), from the entity in addition to the OTP generated by the device 10. Both the second input 50 and the OTP may be processed by the internal processor 32 and communicated to the authentication server 20 in an authentication request.

Each of the device 10, the authentication server 20, and the client device 30 may be a standalone device or an embedded device that is incorporated into a machine or system. For example, each of the device 10, the authentication server 20, and the client device 30 may be a mainframe, a super computer, a PC or Apple Mac personal computer, a hand-held device, a smart phone, or a central processing unit. These devices may be programmed with a series of instructions that, when executed, cause the device to perform authentication according to one or more embodiments described herein. These instructions may be stored on a machine-readable data storage device, which, in one embodiment, may be the internal memory of the device 10, the authentication server 20, or the client device 30, or a combination thereof. Some or all of the steps described in the disclosed embodiments may be performed on a computer apparatus, which may be used to execute a series of instructions representing the steps.

The machine-readable data storage device may store machine language and may be a portable memory device that is readable by at least one of the device 10, the authentication server 20, and the client device 30. Such a portable memory device can be a compact disk (CD), digital video disk (DVD), a Flash Drive, any other disk readable by a disk driver embedded or externally connected to a computer, a memory stick, or any other portable storage medium. Alternately, the machine-readable data storage device can be an embedded component of a computer such as a hard disk or a flash drive of a computer. The machine-readable data storage device can be a standalone device or a device that is embedded into a machine or system that uses the instructions for a useful result, such as one or more of the device 10, the authentication server 20, and the client device 30.

Operation of the system 100 of FIGS. 1 and 2 according to one or more embodiments will now be described with reference to the method and steps depicted in FIGS. 3-4. As will become apparent below, a method according to one or more embodiments may generate an OTP in conjunction with a hash modification, such as adjusting the hashing function or switching seeds, or both. For example, a method according to one embodiment of the present invention may implement one or more features and steps described in U.S. patent application Ser. No. 13/435,481, entitled SLOW AND PERSISTENT PHASED KEY GENERATION, filed on Mar. 30, 2012, to Paul et al., and its provisional application, U.S. Provisional Patent Application No. 61/496,199, entitled SLOW AND PERSISTENT PHASED KEY GENERATOR, filed on Mar. 30, 2011, to Paul et al.—the disclosures of which are incorporated by reference herein in their entirety. In addition to or alternatively, the method according to the illustrated embodiment may utilize protected storage in one or more of the device 10, the authentication server 20, and the client device 30 to aid in secure authentication.

Figure 3:
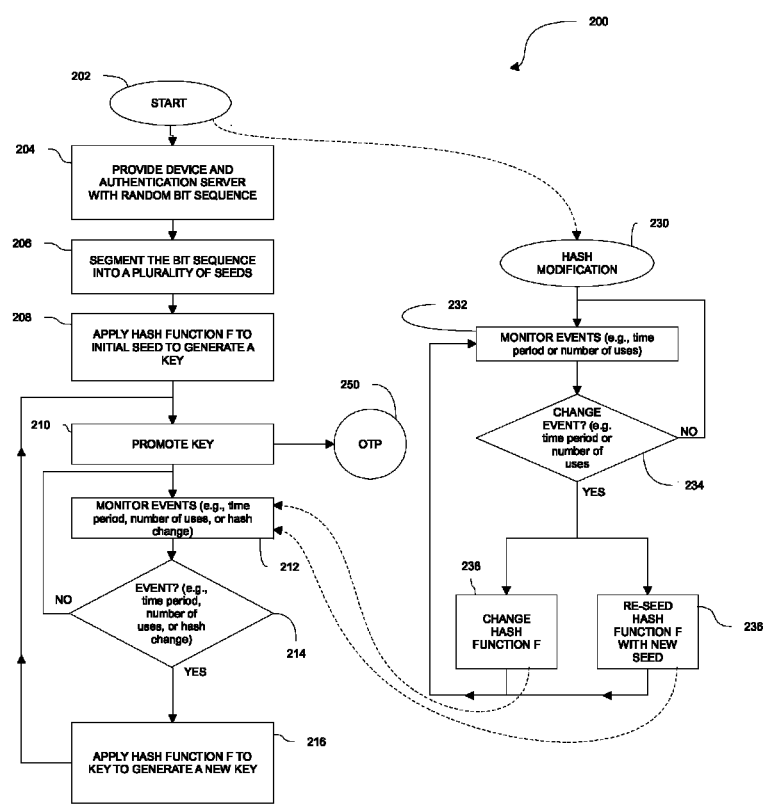
FIG. 3 is a method according to an embodiment of the present invention.

As depicted in the illustrated embodiment of FIG. 3, a method designated 200 for generating a key or an OTP includes using a stream of random bits as a source of randomness. Step 204. The random bits may be generated in a variety of ways from a random number generator. It should be understood that the key or OTP may be based on any source of randomness, including pseudorandom number generators. The stream of random bits may be distributed to both the device 10 and the authentication server 20, and stored in protected memory 16, 26 therein.

The method 200 may be implemented in both the device 10 and the authentication server 20 such that the key or OTP used by the device 10 for authentication or encryption, or both, generally corresponds to the key or OTP used by the authentication server 20. In one embodiment, the device 10 and the authentication server 20 may be synchronized, loosely or precisely, with a clock such that at any given time, the OTPs in the device 10 and authentication server 20 are the same. For example, the device 10 in the authentication server 20 may each generate a new OTP after a predetermined time period (e.g., once per minute), where the clock or timer in each of the device 10 and the authentication server 20 are synchronized such that generation of the new OTP occurs at substantially the same time. In addition to or alternatively, the device 10 in the authentication server 20 may synchronize generation of OTPs based on events, such as after a predetermined number of messages or authentication requests, or based on a remote command, or a combination thereof. Although operation according to the method 200 is described in connection with device 10 and the authentication server 20, it should be understood that all or some steps may be shared or performed, or both, in other devices, such as the client device 30.

At step 206, the method 200 according to the illustrated embodiment includes segmenting the random bit sequence into a plurality of seeds. In this manner, the random bit sequence, or N random bits, may be used as a basis for generating multiple keys or OTPs using a hash function. As will be described in further detail herein, generation of OTPs may include at least one of providing a seed to a hash function to output an OTP and re-applying an OTP to a hash function to output a new OTP. Example hash functions are included in the following protocols: RCS, AES, SHA-256, MD5, and combinations thereof. The process of recursively applying a hash function or iteratively generating OTPs from a hash function by reapplying the hash function output to its input can be referred to as generating a hash chain. An example of generating multiple hash chains is shown in the table below, where each segment, Si, of the seed is used to generate multiple random values from iterative application of the hash function F to form multiple hash chains.

TABLE 1

| | Random Value, $R_0$ | Seed, $S_1$ | $S_2$ | $S_3$ ... |
|---|---|---|---|---|
| $T_1$ | $R_1$ | $F_1(S_1)$ | $F_1(S_2)$ | $F_1(S_3)$ |
| $T_2$ | $R_2$ | $F_2(F_1(S_1))$ | $F_2(F_1(S_2))$ | $F_2(F_1(S_3))$ |
| $T_3$ | $R_3$ | $F_3(F_2(F_1(S_1)))$ | $F_3(F_2(F_1(S_2)))$ | $F_3(F_2(F_1(S_3)))$ |
| ... | ... | ... | ... | ... |

In other words, each segment of the N random bits may be used to generate m OTPs in a hash chain, where a segment of N=R0 and m OTPs=R1||R2 . . . ||Rm−1 and || represents concatenation. N random bits may be stored in the protected memory of the device 10 and each OTP in a hashing function is represented by Ri. Each new set or hash chain of random bits based on seed segments, Si, of the N random bits can be obtained by repeatedly applying the function F to a respective seed, Si, and can be derived as:

Given Ro=Si, Ri=F(Ri−1) for $1 \leq i \leq m-1$ for some integer i.

In operation, the device 10 or authentication server 20 may apply the initial segment of the random sequence to the hash function F to obtain an OTP. Step 208. This OTP may be promoted, or in other words, made available as the current key or OTP for authentication or encryption. Steps 210, 250. The current OTP may remain current until an event occurs, triggering generation and promotion of a new OTP. Steps 212,

214, 216. In one embodiment, the event may be time based, such as after an amount of time has passed, such that the device 10 and the authentication server 20 may each promote a new OTP in a generally synchronized manner. In addition to or alternatively, the event may be based on factors other than time, such as the occurrence of a predetermined number of authentication requests or messages, or in response to a remote message, which may be sent from at least one of the device 10, the authentication server 20, the client device 30, or another source. The event may also be based on the occurrence of a hash modification generated from the hash modification process starting at step 230. Although the method 200 in the illustrated embodiment iteratively applies the hash function in response to an event to generate an OTP in a hash chain, it should be understood that some or all of the OTPs in a hash chain may be computed beforehand, and indexed through or obtained in response to events.

Using the process outlined above, a sequence of randomness can be derived from a single seed value, Ro, using a function F. This sequence may be used to generate multiple OTPs or keys for use in authentication or encryption, or both. However, because attackers may attempt to impersonate or obtain access to otherwise privileged information, one embodiment of the present invention may implement additional steps to further strengthen the degree of security associated with the OTPs. For example, to prevent attackers that try to correctly guess an intermediate value, and therefore correctly guess all future OTPs based on the repeated application of the hash function F in a hash chain, the method 200 may implement a hash modification, such as switching to a new hash function F according to a set policy, or switching to another seed from among the segments of random bits N. Such a hash modification process is shown in the illustrated embodiment of FIG. 3, starting with step 230. The hash modification process may be implemented as part of the method 200, and may take place in parallel or in sequence with the steps outlined herein for generating OTPs.

Starting with step 232, the hash modification process may monitor for and trigger a hash modification based on the occurrence of one or more events. Steps 232, 234. In one embodiment, the device 10 or authentication server 20, or both, may implement a time-based event handler that triggers a hash modification after a period of time has elapsed. Time-based events may enable the process to automatically conduct a hash modification, in one configuration, with no actions other than keeping a loosely synchronized clock between the device 10 and the authentication server 20.

Alternative or additional events that may trigger a hash modification include reaching a predetermined threshold number of OTPs used for a given hash function, or the occurrence of a remote command. Utilizing a remote command may enable networked devices to synchronize hash modifications. Because non-networked devices may lack an ability to communicate with each other, they may implement other event based configurations to trigger a hash modification. In one embodiment, a hash modification may be triggered by different events, such as any of the events described herein and including, for example, a time-based event and the occurrence of a remote command.

Although using a predetermined threshold number of OTPs as an event may add a layer of security in generating OTPs, it should be noted that increasing the threshold number of OTPs may allow an attacker more time to formulate an attack because, without using other events to trigger a hash modification, nothing is done while the number of OTPs used in a hash chain is less than the threshold. In some circumstances that utilize a remote command as an event, an attacker who has compromised a device may ignore the remote command to try to prevent relinquishing control over the communication channel. Such an attempt to ignore the remote command may enable detection of the compromised device. For example, if the authentication server 20 transmits a remote command to the device 10 to perform a hash modification, but the device 10 ignores the command, the authentication server 20 may flag the device 10 as being potentially compromised. In one embodiment, in an attempt to add a further layer of security, the remote command may be encrypted with a key developed outside of the OTPs generated in the method 200. In this way, the attacker may not be aware that a remote command to trigger a hash modification has been received.

Once a hash modification event has occurred, the device 10 or the authentication server 20, or both, may utilize a variety of ways to modify generation of OTPs, thereby potentially enhancing the security of the system against attacks. In the illustrated embodiment of FIG. 3, the hash modification may include at least one of a change to the hash function and switching to a new seed from among the plurality of seed segments obtained from the random sequence N. Steps 234, 236. One or both of these hash modifications may be implemented—though both are depicted in the illustrated embodiment. Additionally, it should be noted that the present invention is not limited to the hash modifications described herein, and that other hash modifications may be implemented.

As mentioned herein, the occurrence of a hash modification may be an event that triggers generation of a new OTP according to the method 200. Steps 212, 214, 216, 236, 238. In this way, once a hash modification has occurred, the device 10 or the authentication server 20 may promote a new OTP based on the modifications. Alternatively, the hash modification may affect how new OTPs are generated but not trigger generation of a new OTP. The device 10 or authentication server 20, or both, may generate a new OTP with the hash modification according to other events described herein with respect to the illustrated embodiment of FIG. 3.

By changing the hash function, the security of the OTPs generated using the method 200 may be enhanced. Step 238. For example, if it is assumed that an attacker has learned or guessed an OTP, and that the attacker has computed the rest of the OTPs in the hash function's sequence, switching to a new hash function F may inoculate the attacker's effort. In other words, by switching to a new hash function F, the OTPs generated according to method 200 may be changed in a manner that maintains consistent authentication or encryption while potentially preventing an attacker from computing future OTPs. In one embodiment, in addition to changing the hash function, the seed used for generation of an OTP may be switched to a new seed. In this way, a new hash chain may be developed based on a new seed and a new hash function. In one embodiment, the last OTP generated from a previous hash function F, based on the current seed, may be utilized as an input to the new hash function F.

By changing the seed from which the OTPs are based, the security of the OTPs generated using the method 200 may also be enhanced. Step 236. As described in connection with the hash function change, by learning or guessing an OTP, an attacker may compute the rest of the OTP in a hash function's sequence or chain. Switching to a different seed may prevent the attacker from computing future OTPs because the future OTPs would be from a different hash chain, and therefore different from future OTPs based on the previous seed.

Using a hash modification may aid in avoiding compromise by a determined attacker without the use of significant stores of keys or OTPs. For example, if it is assumed a device may be compromised 4 times per day, or every six hours, the system may initiate an OTP change or hash modification four times per day to try to avoid use of a compromised OTP or hash chain. The amount of data storage for a seed associated with such a hash modification may be computed using the following formula:

$$TSR = Nseed * Nbits * Ndays * Nyears / [8*(1024^2)]$$

In this formula, TSR is the total storage space in MB. Nseed is the number of initial seeds used per day. Nbits is the size of each OTP key. Ndays is the number of days in a year. Nyears is how long the device is expected to be in service. And, the [8*(1024^2)] denominator simply converts bits to MB. Using the example above, if a hash modification occurs 4 times per day, 1460 keys per year may enable the process to switch keys to avoid compromise. More specifically, if it is assumed that an attacker can compromise an OTP function generation chain four times a day (a new F may be chosen every six hours) with an initial OTP of size 8196 bits and function outputs of 8196 bits, 4098 random bytes of data may be used per day (4 initial seed values for each new function× 8196 bits for each seed). This yields 1.43 MB of true random data used per year. For a device that would last 100 years (well above the expected lifetime of the user), the storage requirements are 143 MB.

Based on this example, it can be seen that the amount of random data used may determine the amount of time a remote attacker can use a compromised system. To increase the security of the system, the system may switch to a new function F more frequently at the cost of increased storage. The limit to this approach includes switching to a new F on every message where F is an idempotent (or "do nothing") function. The OTPs are the groups of bits, denoted Ri, in N.

If an idempotent hash function is used, and a new seed is used as the OTP every 30 seconds, the device 10 would consume approximately 3 MB per day with a 8196-bit OTP. Over 25 years, the storage for this type of usage is just over 25 GB; over 100 years, the storage requirement is just over 100 GB. This is well within a reasonable budget today. In the future storage costs may be lower, and the decreased costs may outpace the increase in required random bits over time. If for some reason this assumption is violated, the system may revert to computational randomness generation using non-idempotent functions.

Turning back to the 143 MB example described above, considering that usage of random numbers is in the range of 1.43 MB per year, and that multi-Gigabyte USB flash drives now sell for below $10, the actual cost per device 10 or token may be less than $1 for the amount of random data storage that could potentially last longer than its user. For purposes of disclosure and to illustrate the potential security afforded by the system, these numbers are conservative in that the ability to compromise a system after a hash modification is chosen to be quiet high—e.g., four times per day. In practice, a function switch or modification per day may be sufficient to achieve a security level desired by the entity. The ability to have secure randomness from physical security rather than relying on computational security alone may provide a stronger security guarantee.

Figure 4:
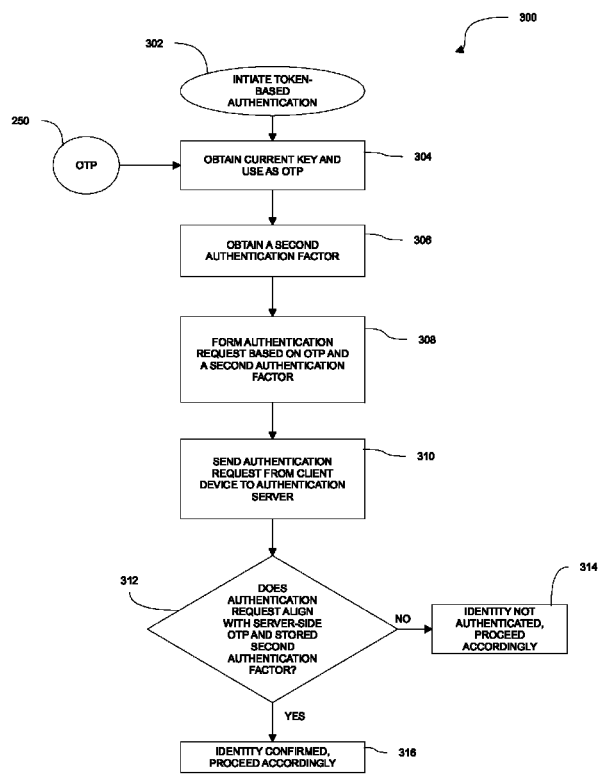
FIG. 4 is a method according to an embodiment of the present invention.

As depicted in the illustrated embodiment of FIG. 4, a method designated 300 for authenticating device 10 using an OTP is described. Once a user or entity initiates authentication, the user may obtain the current or promoted OTP, such as the OTP generated according to the method 200 described in connection with the illustrated embodiment of FIG. 3. Step 302, 304. As mentioned above in connection with the illustrated embodiment of FIGS. 1 and 2, the client device 30 may be configured to obtain a second authentication factor, such as a password, personal identification number (PIN) or biometric identifier. Step 306. In one embodiment, a user may provide both the OTP displayed by the device 10 and the second authentication factor to the client device 30 through a user interface. For example, in one embodiment in which the device 10 is a security token, the user may read the OTP currently displayed by the security token, and enter the OTP into the client device 30 along with the user's password.

In the illustrated embodiment of FIG. 4, the OTP and the second authentication factor may be processed by the client device 30 to form an authentication request, which may be communicated to the authentication server 20. Step 310. One or more of processing, formation, and communication of the authentication request may be conducted on a device other than the client device 30. The authentication server 20 may compare the authentication request to a server-side OTP generated and obtained according to a method described in connection with the illustrated embodiment of FIG. 3. It should be understood that both the device 10 and the authentication server 20 may be running separate but similar processes to arrive at the same OTP for authentication purposes. The authentication server 20 may also compare the authentication request to a version of the second authentication factor, which may be stored in protected storage 26 of the authentication server 20, or may be obtained from an external source, such as another authentication server. Step 412. Based on the comparison between (1) the authentication request and (2) the server-side OTP and stored second authentication factor, the authentication server 20 may confirm the identity of the entity from which the authentication request came. Steps 312 and 316. If the comparison indicates inconsistencies between the authentication request and the server-side OTP and the stored second authentication factor, the authentication server 20 may not authenticate the entity from which the authentication request came. Steps 312 and 314. If the entity is not authenticated, the authentication server 20 in one embodiment may deny access to privileged information that would otherwise be available to an authenticated entity.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A security token for generating a onetime pad (OTP), said security token being physically associated with an entity, wherein said OTP is used in conjunction with one or more factors to form an authentication request to authenticate the entity, said security token comprising:
a processor operable to execute preprogrammed instructions;
a memory operable to store a sequence of randomness and computer programmed instructions executable by said processor for performing the steps of:
segmenting said sequence of randomness into a plurality of seeds;
selecting a first seed from among said plurality of seeds;
hashing an input to generate an output of a first hash chain based on said first seed, said output of said first hash chain being based on at least one of a first plurality of hash functions, wherein said first hash chain is producible by successively hashing said output as said input, wherein, in said first hash chain, each of said first plurality of hash functions is applied to at least one input to generate at least one output;
iteratively hashing said input to generate said output, wherein said input for each successive hash is a previous output;
promoting each successive output generated by hashing said input as said OTP for use in the authentication request;
in response to a hash modification event, switching from said first hash chain to a second hash chain based on a second seed, wherein said second seed is selected from among said plurality of seeds, wherein an output of said second hash chain is based on at least one of a second plurality of hash functions, wherein said second hash chain is producible by successively hashing said output of said second hash chain as an input to at least one of said second plurality of hash functions, wherein, in said second hash chain, each of said second plurality of hash functions is applied to at least one input to generate at least one output;
wherein switching from said first hash chain to said second hash chain includes hashing said second seed according to at least one hash function of said second plurality of hash functions;
wherein one or more hash iterations occur in response to a new OTP event; and
wherein said first plurality of hash functions are different from one another, wherein said second plurality of hash functions are different from one another, and wherein said first seed of said first hash chain and said second seed of said second hash chain are both different from each other and selected from segments of said sequence of randomness.

2. The security token of claim 1 wherein said new OTP event includes at least one of a time-based event, a number of uses associated with said OTP exceeding a threshold, and said hash modification event.

3. The security token of claim 1 wherein said hash modification event includes at least one of a time-based event, a number of outputs used from said hash function exceeding a threshold, and reception of a remote command.

4. A security token for generating a onetime pad (OTP), said security token being physically associated with an entity, wherein said OTP is used in conjunction with one or more factors to form an authentication request to authenticate the entity, said security token comprising:
a processor operable to execute preprogrammed instructions;
a memory operable to store a sequence of randomness and computer programmed instructions executable by said processor for performing the steps of:
segmenting said sequence of randomness into a plurality of seeds;
selecting a first seed from among said plurality of seeds;
generating a first hash chain including at least two hash chain outputs based on said first seed, wherein, in said first hash chain, each of a first plurality of hash functions is applied to at least one input to generate at least one hash chain output, wherein said first plurality of hash functions are different from one another;
selecting a second seed from among said plurality of seeds, said second seed being different from said first seed;
generating a second hash chain including at least two hash chain outputs based on said second seed, wherein, in said second hash chain, each of said second plurality of hash functions is applied to at least one input to generate at least one hash chain output, wherein said second plurality of hash functions are different from one another;
promoting a hash chain output as said OTP for use in the authentication request;
switching from promotion of a hash chain output of said first hash chain to promotion of a hash chain output of said second hash chain;
wherein said first hash chain is generated by applying said first seed as an input to at least one of said first plurality of hash functions to generate an output, and successively applying said output as said input to at least one of said first plurality of hash functions;
wherein said second hash chain is generated by applying said second seed as an input to at least one of said second plurality of hash functions to generate an output, and successively applying said output as said input to at least one of said second plurality of hash functions; and
wherein said security token is configured to switch from promotion of a hash chain output of said first hash chain to promotion of a hash chain output from said second hash chain in response to a hash modification event.

5. The security token of claim 4 wherein said hash modification event includes at least one of a time-based event, a number of outputs used from said first hash chain exceeding a threshold, and reception of a remote command.

* * * * *